United States Patent [19]

Radford et al.

[11] Patent Number: 5,140,498

[45] Date of Patent: Aug. 18, 1992

[54] METHOD OF PRODUCING A WOUND THIN FILM CAPACITOR

[75] Inventors: Kenneth C. Radford, North Huntingdon; Stephen R. Gurkovich, Penn Hills; Deborah P. Partlow, Forest Hills, all of Pa.

[73] Assignee: Westinghouse Electric Corp., Pittsburgh, Pa.

[21] Appl. No.: 687,647

[22] Filed: Apr. 19, 1991

[51] Int. Cl.⁵ ............................................. H01G 9/00
[52] U.S. Cl. .................................... 361/321; 29/25.42
[58] Field of Search ................ 29/25.42; 361/320, 321, 361/322

[56] References Cited

U.S. PATENT DOCUMENTS

| | | | |
|---|---|---|---|
| 2,238,031 | 4/1941 | Brennan | 29/25.42 X |
| 2,693,629 | 11/1954 | Denes | 29/25.42 |
| 2,891,204 | 6/1959 | Kuhn | 361/304 X |
| 2,946,937 | 7/1960 | Herbert | 361/321 |
| 3,819,990 | 6/1974 | Hayashi et al. | 361/321 |
| 3,940,667 | 2/1976 | Pearce | 361/323 |
| 4,271,210 | 6/1981 | Yoldas | 427/169 |
| 4,346,131 | 8/1982 | Yoldas | 428/35 |
| 4,465,739 | 8/1984 | Yoldas | 428/432 |
| 4,973,526 | 11/1990 | Haluska | 428/697 |
| 5,028,455 | 7/1991 | Miller et al. | 427/126.3 |

Primary Examiner—Donald Griffin
Attorney, Agent, or Firm—T. H. Martin

[57] ABSTRACT

A wound thin film capacitor is formed by the method of applying a solution of a metal-organic alkoxide composition to at least one flat surface of an electrically conductive metal strip and heating the coated strip so as to remove the organic component of the metal-organic alkoxide composition and produce a thin, electrically non-conductive metal oxide film on the flat surface. The metal strip with the metal oxide coating is then wound on a spool to form a wound thin film capacitor.

11 Claims, 2 Drawing Sheets

METHOD OF PRODUCING A WOUND THIN FILM CAPACITOR

FIELD OF THE INVENTION

The present invention relates to a method of producing a wound thin film capacitor, and more specifically, to a method of forming wound thin film capacitors having an electrically non-conductive ceramic metal oxide film on the surface of an electrically conductive metal strip.

BACKGROUND OF THE INVENTION

Requirements for electrical components, such as capacitors, continually demand improvements in efficiency, reduction in size and weight, and the ability to operate under extreme environmental conditions.

For critical applications which require high operating temperatures, approaching 500° C., or low operating temperatures, such as cryogenic applications, conventional capacitor technology is not feasible. Metallized film and film foil capacitors, using polymer films, formed by a winding process, represent a state-of-the-art system for high electrical energy storage. The energy storage efficiency of this type of capacitor is limited by the dielectric constant of the polymer dielectric film $\epsilon' \sim 3$).

While marked improvements in energy storage could be realized by the use of higher dielectric constant ceramic materials (e.g., $\epsilon' \sim 2000$), conventional processing of bulk ceramic materials provides materials that are noted for their relatively low breakdown strength, which would limit the potential gain in energy storage from the higher dielectric constant.

SUMMARY OF THE INVENTION

A wound thin film capacitor is produced by providing an electrically conductive metal strip, applying a solution of a metal-organic alkoxide composition to at least one, and preferably both flat surfaces of the strip to form a metal-organic alkoxide coating thereon, and heating the coated strip so as to remove the organic component of the metal-organic alkoxide composition and produce a thin, electrically non-conductive metal oxide film on the surface of the strip. The electrically conductive metal strip, having a thin electrically non-conductive, metal oxide film on at least one surface, is then wound about a spool to form a wound thin film capacitor.

The electrically conductive metal strip preferably has a thickness of between 0.001–0.010 inch (0.0025–0.025 cm) and the thin electrically non-conductive, metal oxide film preferably has a thickness of between 0.1 to 10 microns.

The application of the solution of metal-organic alkoxide composition is continuously affected either by dipping the strip into a bath of the solution or by spraying the solution on one or both of the surfaces.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION

Figure 1:
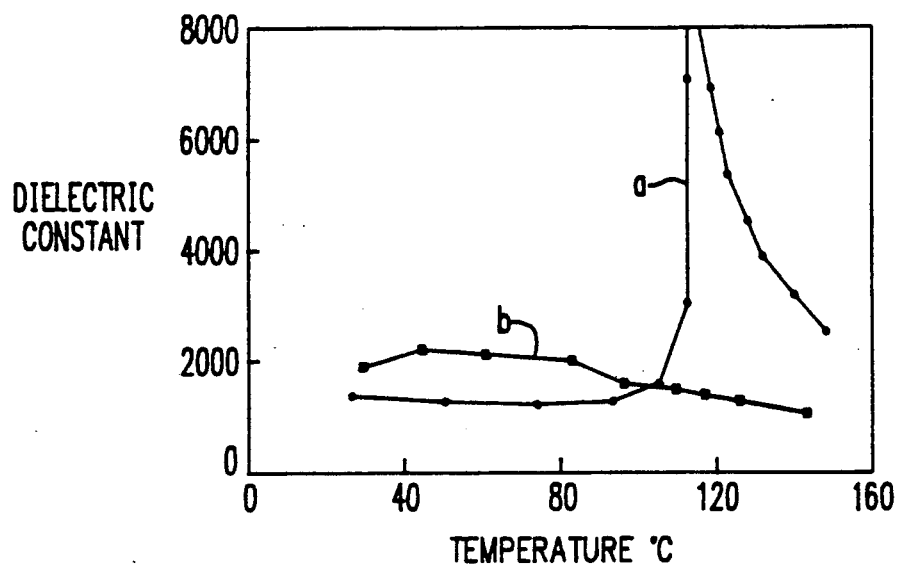
FIG. 1 is an illustration of the dielectric constant of BaTiO$_3$ and a doped BaTiO$_3$ (modified with MgO, ZrO$_2$) as a function of temperature.

A thin electrically non-conductive metal oxide film is formed on an electrically conductive metal strip by application of a metal-organic alkoxide to the strip and heating the metal-organic alkoxide coated strip to remove the organic component of the metal-organic alkoxide coating.

It is important to the present method that a high quality continuous non-conductive metal oxide film be adhered to the surface of the conductive metal strip. Non-conductive film synthesis begins with alkoxide starting materials of the form MOR, where M is a metal and R is an organic alkyl group. After dilution in a carrier fluid, usually an alcohol, the alkoxide is partially hydrolyzed:

With the onset of such hydrolysis, a competing reaction, polymerization occurs:

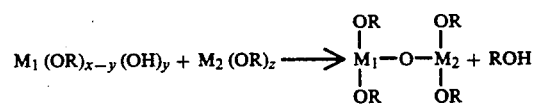

which yields an oxide in solution polymeric structure. Continued polymerization enables a long chain structure to develop, and it is also possible to create mixtures of dissimilar metals at an atomic scale, as depicted by M1 and M2.

The kinetics of competing hydrolysis and polymerization reactions depend on the concentration of the starting materials, the molecular size of the diluting fluid, the temperature of the system, the amount of hydrolysis water, and the presence of catalysts. Consequently, these parameters become important determining factors in the structure of the resulting gel network, particularly the ratio of bridging to non-bridging oxygens, which in turn controls the porosity of the film after pyrolysis. In the SiO$_2$ system, for example, increased amounts of hydrolysis water in the precursor solution promote the formation of oxygen bridges and lead to a clear glassy product, fused silica, upon hydrolysis at 500° C. Since pyrolysis is carried out at low temperatures (usually 350° to 500° C. depending on the actual film composition), sol-gel film deposition is suited to a wide variety of substrates.

The sol-gel method involves deposition of films on electrically conductive metal substrates from organo-metallic alkoxide precursor solutions followed by pyrolysis of the film to remove organic species and promote densification. Metal substrates that can tolerate the pyrolysis temperatures must therefore be chosen. These temperatures will be dependent on the specific dielectric system chosen, but the temperature may well be greater than 500° C. in order to produce a dense, pore-free film. Table I shows potential metal substrates and their thermal, electrical, and physical properties.

TABLE I

| SUB-STRATES | RESISTIVITY $\mu pcm^{(1)}$ | EXPANSION $\times 10^{-6}$ °C.$^{-1}$ | MELTING POINT °C. | TENSILE STRENGTH $MPa^{(2)}$ | DENSITY g/cc |
|---|---|---|---|---|---|
| Al | 2.67 | 23.5 | 660 | 50–195 | 2.7 |
| Ti | 54.0 | 8.9 | 1660 | 230–460 | 4.5 |
| Fe | 10.1 | 12.1 | 1535 | 180–210 | 7.9 |
| Cu | 1.69 | 17.0 | 1083 | 224–314 | 9.0 |
| Nb | 16.0 | 7.2 | 2468 | 330–585 | 8.6 |
| Ni | 6.9 | 13.3 | 1453 | 400–660 | 8.9 |
| Ag | 1.63 | 19.1 | 962 | 172–330 | 10.5 |
| Mo | 5.7 | 5.1 | 2617 | 485–690 | 10.2 |
| Ta | 13.5 | 6.5 | 2996 | 310–760 | 16.6 |
| W | 5.4 | 4.5 | 3410 | 550–1920 | 19.3 |

[1] microohms/centimeter
[2] megapascals

Aluminum is currently used in film capacitors because of its excellent conductivity and low density. Its low melting point of 660° C. may present difficulties during pyrolysis of the films. If the pyrolysis temperature is too close to the melting point of Al, elongation of the film could occur, giving rise to inhomogeneities in film thickness, in addition to which the strength of the thin Al foil may be insufficient to allow continuous processing. Selection of alternative substrates requires some trade-off in weight for higher temperature strength and stability. Table I, arranged according to densities, shows that Ti is only 66% more dense than Al while extending the potential processing temperature to well over 1500° C. The density of Fe is greater by a factor of less than three, and a number of lower expansion Fe alloys are available which are good expansion matches for a number of ceramic materials. Although coatings have been successfully deposited on materials with significant differences in expansion, reduction of residual stresses due to expansion mismatch will improve reliability of the capacitors during discharge.

Ceramics, particularly high dielectric constant materials, generally exhibit relatively poor dielectric strength in bulk form, mainly due to inherent flaws created during processing, in particular, pores. As the thickness of a bulk ceramic decreases, marked increases in the dielectric strength are measured primarily because the probability of critical flaws is reduced. Significant improvements in dielectric strength have been observed in thin film materials.

Generally speaking, although ceramics have a very broad range of dielectric properties, ceramics with lower values also exhibit lower losses (tan δ), and have a relatively minor change with increasing temperature. Ceramics with high dielectric constant exhibit a Curie point with concomitant significant change in dielectric constant (and losses) with temperature, as shown, as (a), in FIG. 1 for $BaTiO_3$. Mixtures of ceramics allow an even wider range in dielectric constant, and minor doping additions to the high dielectric constant materials can change the value and also shift significantly the temperature of the Curie point (peak in dielectric constant), thus enabling the material's use over a higher or lower temperature range in which the change in dielectric constant may be quite small.

Figure 2:
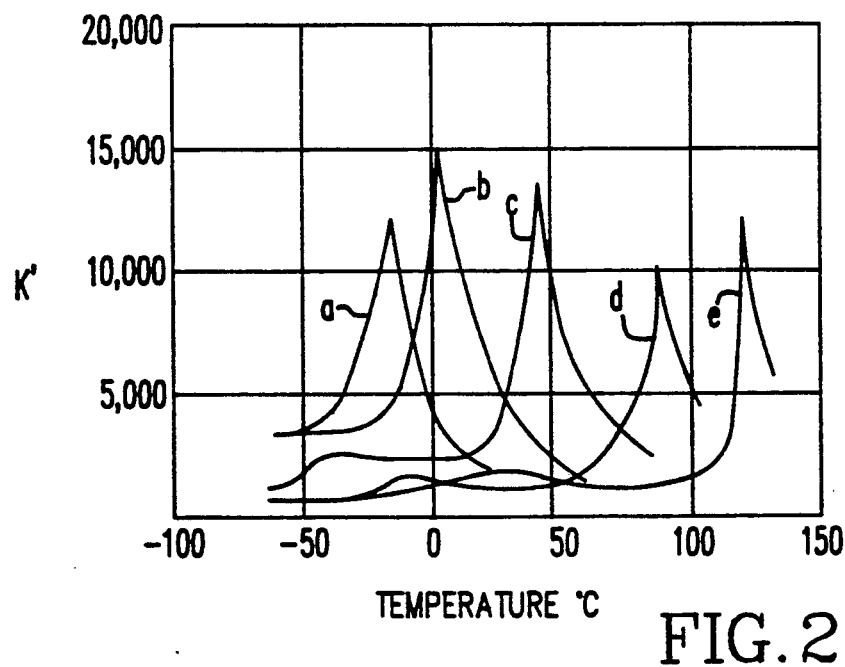
FIG. 2 illustrates the Curie point shift of BaTiO$_3$ with various dopant additions.

FIG. 1 also shows, as (b), a $BaTiO_3$ ceramic modified with $MgO.ZrO_2$, demonstrating the extent to which the Curie point can be depressed while retaining a significant $\epsilon'$. Much flatter $\epsilon'$ vs. T curves can be obtained with controlled additions of other elements, as exhibited by NPO-type ceramics. Flattening of $\epsilon'$ vs. T curves has also been achieved by maintaining very fine grain size. Both controlled, uniform doping and ultra-fine grain sizes are readily achieved using the sol-gel process. FIG. 2 shows how substitution of Sr for Ba in $BaTiO_3$ ($a=Ba_{61}Sr_{39}TiO_3$: $b=Ba_{68}Sr_{32}TiO_3$: $c=Ba_{79}Sr_{21}TiO_3$: $d=Ba_9Sr_1TiO_3$ and $e=BaTiO_3$) shifts the Curie point below 0° C., thereby producing a relatively flat dielectric constant with temperature above room temperature.

Although the lower dielectric constant ceramics exhibit little change in properties with temperatures at very high frequencies, there is an undesirable effect at lower frequencies on dissipation factor or loss. At frequencies of 400 Hz and lower, the losses and dielectric constant increase with temperature because of ion jump relaxation processes. The effect of temperature and frequency is therefore necessary to characterize the ceramic film materials for these applications.

The specific ceramic used will be based on specific goals. For cryogenic applications, Curie temperatures of high dielectric constant materials do not become a factor because they are well above room temperature, and system analysis will dictate where trade-offs between size and weight reduction and electrical losses can be made.

For higher temperature applications, the temperature stability of dielectric constant become a primary concern. As already mentioned, many high dielectric constant materials exhibit large changes in ' with temperature as they approach their Curie temperatures, and would have to be modified for high temperature applications by either doping or by grain size refinement, or both. A number of low dielectric constant materials, such as $SiO_2$ and $Al_2O_3$, do not offer major increases in energy efficiency, but they could achieve a greater temperature stability on an equal weight basis to temperatures well above 300° C. Table II shows some additional ceramic materials indicating the wide range of readily achievable dielectric constants. This list, of course, is not all encompassing, and there are many other potential sol-gel candidate compositions.

TABLE II

| DIELECTRICS | $\epsilon'$ | TAN δ | $TCE^{(1)} \times 10^{-6}$ °C.$^{-1}$ | DENSITY g/cc |
|---|---|---|---|---|
| $SiO_2$ | 3.8 | .0003 | 0.5 | 2.2 |
| $Al_3O_3$ | 10 | .0003 | 7.2 | 3.9 |
| $TiO_2$ | 90 | .0005 | 8.2 | 3.2 |
| $BaTiO_3$ | | | 7.5 | 6.1 |
| NPO | 62 | <.002 | — | — |
| Yb doped | 500–3900 | 0.06–0.325 | — | — |
| $MgTiO_3$ | 14 | .0025 | 7.5 | 4.0 |

TABLE II-continued

| DIELEC-TRICS | $\epsilon'$ | TAN δ | TCE[1] $\times 10^{-6}$ °C.$^{-1}$ | DENSITY g/cc |
|---|---|---|---|---|
| CaTiO$_3$ | 153 | .0003 | 7.5 | 4.0 |
| SrTiO$_3$ | 240 | .00012 | 7.5 | 5.1 |
| PZT (8/90/10)[2] | 303 | .004 | — | 7.9 |
| PMN89[3] | 6700-9000 | .003 | — | 7.9 |

[1]Temperature Coefficient of Expansion
[2]Lead—Zirconium—Titinate
[3]Lead—Magnesium—Niobate In addition to the higher density of ceramics, the potential need for alternative metal substrates with greater thermal stability may have an overall impact on the capacitor weight. A weight analysis was conducted to determine the potential weight trade-offs between different dielectrics and substrate metals. For this analysis, five dielectric materials were selected to represent the expected variations in density and dielectric constant, and three metals were chosen as electrodes to represent the potential range of weight differences. The materials selected are shown in Table III.

TABLE III

| CERAMIC | DENSITY g/cm$_3$ | $\epsilon'$ | METAL | DENSITY g/cm3 | MELTING TEMP. °C. |
|---|---|---|---|---|---|
| SiO$_2$ | 2.6 | 3.8 | Al | 2.7 | 660 |
| Al$_2$O$_2$ | 3.9 | 10 | Ti | 4.5 | 1660 |
| TiO$_2$ | 4.3 | 90 | Ni | 8.9 | 1453 |
| BaTiO$_3$ | 6.1 | 1500 | | | |

The effect of substituting relatively heavy metal substrates was also examined as a function of dielectric and foil thicknesses. These analyses retain Al as the foil for the polymer dielectric in order to normalize the weight comparisons while substituting the heavier metals with the ceramic dielectrics.

Sensitivity analyses indicate that ceramics with dielectric constants approaching 100 enable significant reductions in capacitor volume and weight. The impact on volume and weight is more than sufficient to compensate for more refractory (and more resistive) metal substrates.

Metal oxide films especially suited for use as an electrical non-conductive metal oxide film on the metal strip according to the present invention include those composed of a metal oxide such as SiO$_2$, Al$_2$O$_3$, TiO$_2$, BaTiO$_3$, MgTiO$_3$, CaTiO$_3$, SrTiO$_3$, Al$_2$O$_3$-SiO$_2$, TiP$_2$-SiO$_2$, NaOAl$_2$O$_3$, ZrO$_2$-Y$_2$O$_3$, B$_2$O$_3$-SiO$_2$, PbO-TiO$_2$, Li$_2$O-Nb$_2$O$_5$, Pb · MgO · Nb$_2$O$_5$, LiO · Ta$_2$O$_5$, or mixture thereof.

The ability to apply films which are adherent after bending was demonstrated by forming a 10 μm SiO$_2$ film on stainless steel and shows that such an oxide film of significantly different expansion coefficient can be applied to a metal substrate and bent without cracking or delaminating. A three layer SiO$_2$ coating (approximately 0.15 μm thick) was applied to a thin (1 mil) aluminum strip and fired at 500° C. and was bent around a 0.635 cm glass tube. No evidence of cracking or flaking was observed indicating a high probability of being able to wind coated metal strips to form a finished capacitor.

Also, measurements were made on a TiO$_2$-SiO$_2$ film (95% TiO$_2$) which was fired for 30 minutes at 500° C. The film thickness was 3388Å and a dielectric constant of ~ 30 was measured with a dielectric strength 22 V/μm. This film was prepared to meet a specific refractive index and it is expected that with higher firing temperatures of 600-700° C. a dense film exhibiting higher dielectric constant and higher dielectric strength would result.

The application of the metal-organic alkoxide composition solution to the metal strip is preferably by dipping or spraying the strip and then heating the coated strip to remove the organic component of the metal-organic alkoxide composition coating and forming a metal oxide film on the strip.

Figure 3:
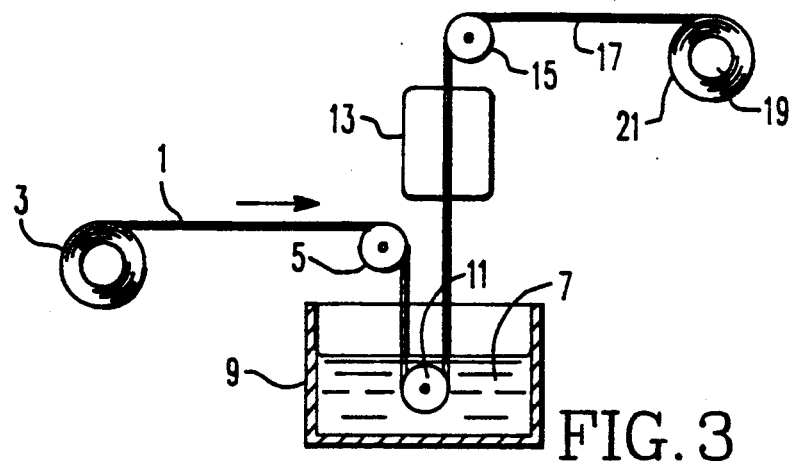
FIG. 3 is a schematic illustration of an embodiment of the present invention where the metal-organic alkoxide composition is applied to the strip by dipping.

An embodiment of application of the metal-organic alkoxide composition solution to the electrically conductive metal strip by dipping is illustrated in FIG. 3. An electrically conductive continuous metal strip 1 is unwound from a roll 3 of said strip, over a roller 5 and is directed into a bath 7 of metal-organic composition alkoxide solution contained in a vessel 9. The strip 1 may be passed around a roller 11 in the bath 7 and is then directed through a pyrolysis furnace 13. In the furnace 13, the coated strip is heated to a temperature sufficient to remove the organic component of the metal-organic alkoxide to produce a thin, electrically non-conductive, metal oxide film on the flat surface of the metal strip. The strip is then passed around a further roller 15 and the strip 17, with the film adhered thereto, is wound on a spool 19 to form a wound thin film capacitor 21. In the event that a single pass through the bath 7 of metal-organic composition alkoxide solution and pyrolysis does not provide the desired thickness of metal oxide film, multiple dipping and pyrolysis steps may be used. To minimize defects, the coating system should be totally enclosed in a clean room facility.

Figure 4:
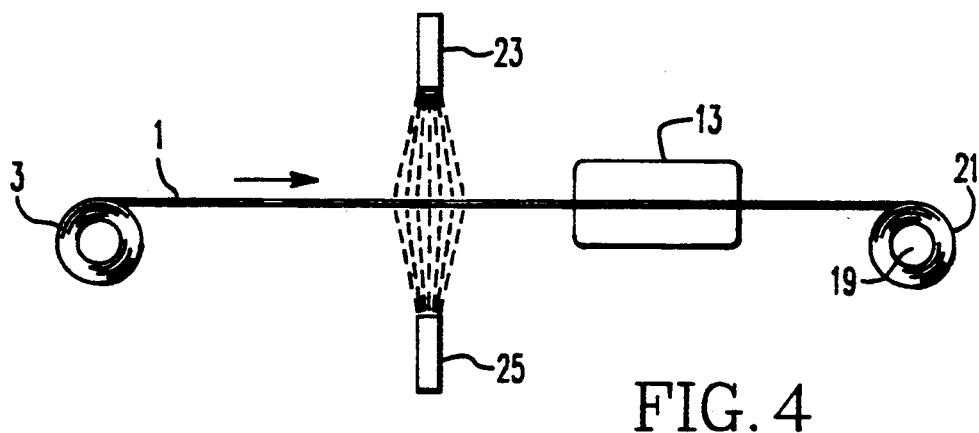
FIG. 4 is a schematic illustration of an embodiment of the present invention where the metal-organic alkoxide composition is applied to the strip by spraying.

Another embodiment of the application of the metal-organic alkoxide composition solution to the electrically conductive metal strip by spraying is illustrated in FIG. 4. A continuous electrically conductive metal strip 1 is unwound from a roll 3 of said strip, and passed by a spray nozzle 23, and preferably between spaced spray nozzle 23, 25, from which a metal-organic alkoxide composition solution is directed on to the surface of the elastically conductive material strip The coated strip is then directed through a pyrolysis furnace 13. As with the dipping embodiment, the coated strip is heated in furnace 13 to produce a thin, electrically non-conductive, metal oxide film on the flat surface of the metal strip. The strip 17, with the film adhered thereto, is then wound on a spool 19 to form a wound thin film capacitor 21.

Figure 5:
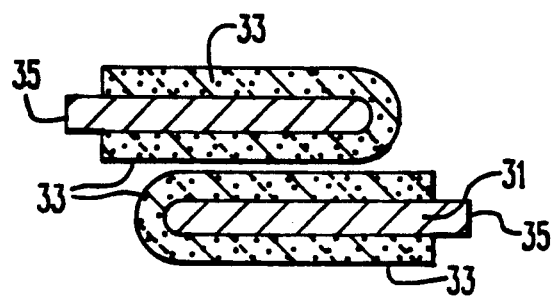
FIG. 5 is a view of adjacent wound layers of a preferred embodiment of a capacitor formed by the method of the present invention.

The extended foil capacitor is an ideal structure for taking advantage of the unique properties of the sol-gel metal oxide coated metal strip. This embodiment, as illustrated in FIG. 5, shows two adjacent wound layers of electrically conductive metal strip 31, each having a thin electrically non-conductive, metal oxide film 33 on both flat surfaces resulting in two layers of dielectric between electrodes of a wound capacitor. Preferably, their respective edges 35 will be offset and bared for electrical contact to the electrically conductive metal strip. This should permit using large area capacitor dielectrics with these non-conductive, metal oxide films, assuring they have few defects, so that any defects in one film layer will be covered by a defect-free dielectric area of the adjacent film layer. Observations that sol-gel coatings are virtually flaw-free gives credence to the expectation that such large area capacitors can be made without failure due to overlapping defects.

To produce an electrically conductive metal strip with a thin, electrically non-conductive, metal oxide film with an edge 35 exposed for electrical contact, that edge may be treated so that the solution of metal-organic alkoxide will not wet the edge to adhere to the same. If there is a problem keeping the coating off the edge 35 of the strip 31, the edge will be polished on a roll to bare the metal. The capacitors will then be wound with one bare edge exposed on each side.

The present method uses a simple coating method using solutions which results in a uniform and controllable coating thickness of the metal-organic alkoxide composition and resulting metal oxide film on the metal substrate. The method enables the formation of metal oxide films of multiphase compositions and provides homogeneity at the atomic level. High density, pore free films are producible and lower pyrolysis or sintering temperatures may be used as compared with conventional ceramics. The method enables formation of an electrically non-conductive, metal oxide film on any electrically conductive metal strip that can withstand the pyrolysis temperature.

What is claimed is:

1. A method of producing a wound thin film capacitor comprising:
   providing an electrically conductive metal strip having opposed flat surfaces;
   applying a solution of a metal-organic alkoxide composition to at least one of said flat surfaces to form a metal-organic alkoxide coating thereon;
   heating the resultant coated strip so as to remove the organic component of said metal-organic alkoxide composition and produce a thin, electrically non-conductive, metal oxide film on at least one of said surfaces; and
   winding the electrically conductive metal strip having said thin electrically non-conductive, metal oxide film on said at least one surface about a spool to form a wound thin film capacitor.

2. The method as defined in claim 1, wherein said metal strip is composed of a metal selected from the group comprising Al, Ti, Fe, Cu, Nb, Ni, Ag, Mo, Ta and W and mixtures thereof.

3. The method as defined in claim 1, wherein said metal strip has a thickness of between 0.0025–0.025 cm.

4. The method as defined in claim 1, wherein said electrically non-conductive, metal oxide film has a thickness of between 0.1 to 10 microns.

5. The method as defined in claim 1, wherein said electrical non-conductive, metal oxide film is composed of a metal oxide selected from the group comprising $SiO_2$, $Al_2O_3$, $TiO_2$, $BaTiO_3$, $MgTiO_3$, $CaTiO_3$, $SrTiO_3$, $Al_2O_3$-$SiO_2$, $TiO_2$-$SiO_2$, $NaO$-$Al_2O_3$, $ZrO_2$-$Y_2O_3$, $B_2O_3$-$SiO_2$, $PbO$-$TiO_2$, $Li_2O$-$Nb_2O_5$, $PbO$. $MgO$. $Nb_2O_5$, $LiO$. $Ta_2O_5$ or mixtures thereof.

6. The method as defined in claim 1, wherein said solution of a metal-organic alkoxide composition is applied to both said flat surfaces.

7. The method as defined in claim 6, wherein said solution of a metal-organic alkoxide composition is applied to both said flat surfaces of said strip by dipping said strip into said solution.

8. The method as defined in claim 1, wherein said solution of metal-organic alkoxide composition is applied to at least one of said flat surfaces of said strip by spraying said solution on said surfaces.

9. The method as defined in claim 8, wherein said solution of metal-organic alkoxide composition is applied to both said flat surfaces of said strip by spraying said solution on said surfaces.

10. A wound thin film capacitor prepared according to the process of claim 1.

11. A method of producing a wound thin film capacitor comprising:
    providing an electrically conductive metal strip, having a thickness of between 0.0025–0.025 cm, and
    applying a solution of a metal-organic alkoxide composition to at least one of said flat surfaces to form a metal-organic alkoxide coating thereon;
    heating the resultant coated strip so as to remove the organic component of said metal-organic alkoxide composition and produce a thin, electrically non-conductive metal oxide film, having a thickness of between 0.1 to 10 microns on at least one of said surfaces; and
    winding the electrically conductive metal strip having said thin electrically non-conductive, metal oxide film on said at least one surface about a spool to form a wound thin film capacitor.

* * * * *